Nov. 11, 1958

E. DYKE ET AL 2,860,238

DIVERSITY RECEIVING SYSTEM

Filed March 5, 1953

2 Sheets-Sheet 1

Inventors.
Edwin Dyke
Henry Magnuski
By Foorman L. Mueller
Atty.

DIVERSITY RECEIVING SYSTEM

Filed March 5, 1953 2 Sheets-Sheet 2

INVENTORS.
Edwin Dyke
Henry Magnuski
By Norman L. Mueller
Atty.

United States Patent Office 2,860,238

Patented Nov. 11, 1958

2,860,238

DIVERSITY RECEIVING SYSTEM

Edwin Dyke, Brookfield, and Henry Magnuski, Chicago, Ill., assignors to Motorola, Inc., Chicago, Ill., a corporation of Illinois Application March 5, 1953, Serial No. 340,572

2 Claims. (Cl. 250—20)

This invention relates generally to diversity receiving systems and more particularly to diversity receiving systems for use at very high frequencies commonly called microwaves.

It is well-known that in radio transmission, waves transmitted from one station to another may be transmitted over a plurality of paths and the various waves may by the transmission be so shifted in phase with respect to each other that the waves at the receiving means may cancel each other out to produce what is normally called fading of the signal.

For microwave use, line of sight is required so that there is always one direct path. There may be other paths caused by reflection of the waves from the land, water, or man-made structures. There may also be bending of the paths by the atmosphere so that paths which are not actually reflected will be bent to have different lengths from each other which may produce cancellation at the receiving antenna to thereby cause fading. It will be obvious that such conditions vary with time because of the changing atmospheric conditions and, although some predictions may be made, it is not possible to accurately determine what these changes will be.

To compensate for fading due to multipath propagation, it has been proposed to space receivers and provide a system for using one or the other of a plurality of receivers which produces the best signal at a given moment. It has also been proposed to combine the outputs of a plurality of receivers. However, such systems require complete duplication of equipment and have not been found to provide satisfactory results under all conditions.

It is an object of this invention to provide an improved diversity receiving system.

Another object of the present invention is to provide a diversity receiving system requiring only a single receiver, with the received signals being combined at radio frequency level.

A further object of this invention is to provide a diversity receiving system for microwave use in which signals from spaced antennas are combined and the phase of at least one of the signals is adjusted in accordance with the level of the combined received signal.

A still further object of this invention is to provide a diversity receiving system including spaced antenna means and means for combining the signals therefrom with one of the signals being effectively shifted in phase so that the desired waves are added and the undesired waves are canceled out to thereby provide a strong received signal.

A feature of this invention is the provision of a diversity receiving system including antennas having spaced wave receiving means which apply waves to a single receiver, and including phase shift means for shifting the phase of the wave from one wave receiving means with respect to the wave from the other. The phase shift means may be adjustable either manually or automatically to compensate for changes in phase due to changes in path length resulting from changing atmospheric conditions.

Another feature of this invention is the provision of a diversity receiving system including first and second antenna reflectors mounted on a single mast one above the other, with the reflectors directing the waves onto a single antenna, with one of the reflectors being adjustable in position so that the phase of the wave therefrom may be shifted.

A further feature of this invention is the provision of a diversity receiving system in which signals from two spaced microwave antennas are separately mixed with oscillations from a single source, with the oscillations being applied to one mixer through phase shift means for changing the phase of the waves from said one mixer, and the outputs of the mixers being combined and then detected.

Still another feature of this invention is the provision of a microwave receiving system wherein two-spaced antennas are connected to a receiver and/or transmitter through waveguides, with one waveguide having phase shift means therein and means to adjust the phase shift produced thereby in accordance with the strength of the signal of the received signal. In the event that the two antennas are used for both receiving and transmitting, a pair of phase shift means may be provided in separate paths which are isolated from each other by resonant cavity filters.

Further objects, features and the attending advantages of the invention will be apparent from a consideration of the following description when taken in connection with the accompanying drawings, in which.

In practicing the invention there is provided a diversity receiving system for use at microwave frequencies for combining waves transmitted over slightly different paths in such a maner that the combined signal is maximum. This may be accomplished by the use of two separate antennas which are coupled to a single receiver, with phase shift means in the transmission line from one antenna for shifting the phase of the waves received by this antenna. The adjustment of the phase shift means may be accomplished either manually or automatically and the position of the shifter is adjusted to compensate for the phase shifts introduced in the system as by changing atmospheric conditions. The phase shifter should always be adjusted as to obtain the phase addition of two signals and thus the maximum output of the receiver. If automatic adjustment is used, any suitable servo mechanism, which so controls the position of the phase shifter as to obtain this maximum receiver output at all times, can be used. In another embodiment of the invention, spaced antenna reflectors are provided which direct waves onto a single antenna, with one of the reflectors being adjustable in height to change the phase of the wave applied therefrom to the antenna. In a further embodiment spaced antennas may apply signals to separate mixers with a single local oscillator being provided for the two mixers and the path from the local oscillator to one mixer including phase shift means for thereby shifting the phase of the output of the mixer so that the outputs from the two mixers can be combined to provide maximum signal.

Although the diversity system is applied particularly to receivers, it is also applicable to transmitter and may be applied simultaneously for transmission and reception by the use of separate phase shifters provided in separate paths which may be isolated from each other with respect to the transmitting and receiving frequencies.

Figures 1, 2:
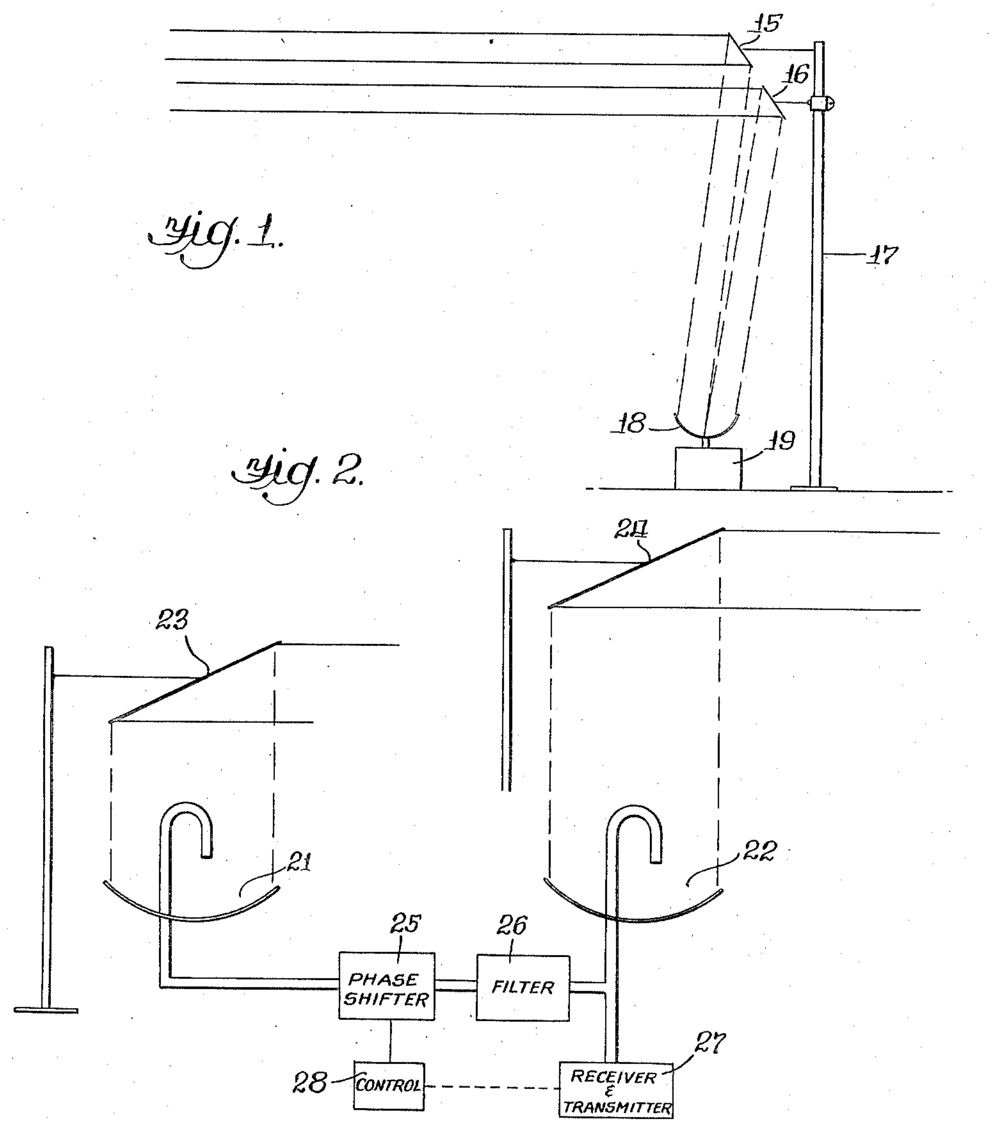
Fig. 1 illustrates an embodiment of the invention utilizing a single antenna with spaced antenna reflectors.
Fig. 2 illustrates an embodiment having spaced antennas with waves therefrom combined at RF level by waveguides.

Referring now to the drawings, in Fig. 1 there is illustrated a system wherein antenna reflectors 15 and 16 are provided on a single mast 17. Since line of sight is required for microwave operation, the masts must generally be quite high and therefore are relatively expensive. It is, therefore, desirable to eliminate the cost of a second mast. Waves from the two reflectors 15 and 16 are directed on a single antenna 18 which may be a parabolic reflector for directing waves to a horn or the like. These waves are then applied to the receiving and/or transmitting equipment 19. The reflectors 15 and 16 are spaced from each other vertically and also horizontally so the waves associated with each do not interfere with the other but are combined on the antenna 18. One of the reflectors such as the reflector 16 may be adjustable vertically, and by changing the position the overall length of the path provided thereby is changed so that the phase of the wave therefrom is changed. The waves from the two reflectors are combined in the antenna 18 and therefore by changing the phase of one wave the relative phase of the two waves is changed. By properly positioning the reflectors, therefore, the waves can be combined in the desired phase relationship to provide a maximum combined signal.

In Fig. 2 there is illustrated a similar system in which the combining and phase shifting are accomplished in a different manner. To separate antennas 21 and 22 are provided which include reflectors 23 and 24 respectively for directing waves thereto and therefrom. Although shown separately, the reflectors 23 and 24 may be supported on a single mast. The output from antenna 21 is applied through a phase shifter 25 and a filter 26 and then combined with the output of the antenna 26, with the combined output being applied to the receiver 27. The phase shifter 25 may be adjustable so that the wave from the antenna 21 will be controlled to have the proper phase to combine with the wave from the antenna 22 to produce a maximum output in the receiver 27. This control may be manual, or may be accomplished automatically through a control unit 28 coupled to the receiver 27. The filter 26 is necessary only when the unit 27 includes both a receiver and a transmitter and may be eliminated if reception only is desired. The filter 26 may be a tuned cavity resonator which passes the received frequencies, and which presents a high impedance to the transmitted frequencies. Therefore transmission can take place only through the antenna 22, and diversity reception can be provided from the antennas 21 and 22.

The phase of the wave from the antenna 21 may be changed by changing the vertical position of either the antenna proper or the vertical position of the reflector 23. This will change the length of the path between the reflector 23 and the antenna, and thereby change the phase of the received wave. This arrangement eliminates the need for the wave guide phase shifter as illustrated. Various manual or automatic adjusting devices can be provided for changing the vertical position of the antenna 21.

Figure 3:
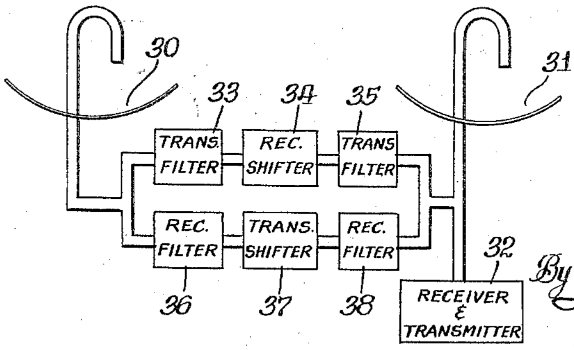
Fig. 3 illustrates a system providing spaced antennas for both diversity reception and diversity transmission.

As previously stated, it may be desirable to use diversity transmission as well as diversity reception. For such operation the system of Fig. 2 may be modified as shown in Fig. 3. In this system two antennas 30 and 31 are provided, with the antenna 31 being directly connected to the transmitter receiver 32. Antenna 30 is connected to transmitter receiver 32 through two separate paths, the first including filter 33, phase shifter 34 and filter 35, and the second including filter 36, phase shifter 37 and filter 38. The first path is the receiving path with the filters 33 and 35 passing the receiving frequency and forming a high impedance to the transmitting frequency. The shifter 34 may therefore be adjusted to properly phase the waves received from antenna 30 to provide a maximum output of the receiver 32.

The second path is the transmitting path and the filters 36 and 38 are constructed to pass the transmitting frequency and to present a high impedance to the receiving frequency. The phase shifter 37 may be adjusted so that the waves transmitted from the antenna 30 has the proper phase relationship with respect to the waves transmitted from the antenna 31 so that at the receiver the two paths combine properly to provide maximum signal. To control the phase shifter 37 it is necessary to receive indications of the signal strength from the receiver with which the transmitter is communicating. Such a system makes it unnecessary to provide diversity reception at the receiver in the communication system.

Figure 4:
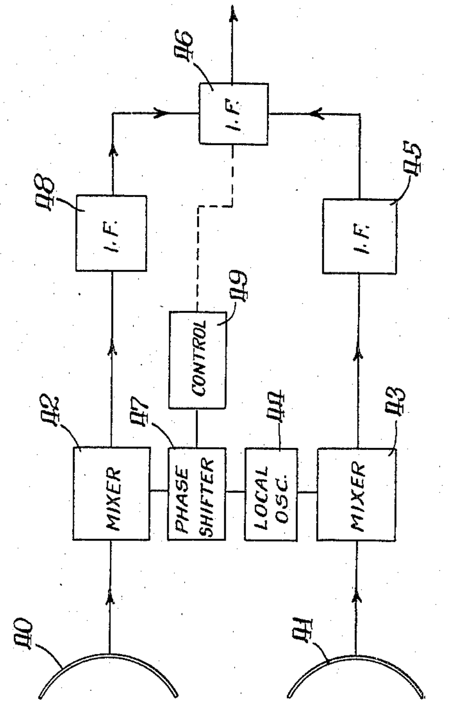
Fig. 4 illustrates an embodiment of the diversity receiving system having phase shift control applied to the oscillations from a common local oscillator.

In Fig. 4 there is shown a further embodiment wherein waves from two antennas 40 and 41 are applied to separate mixers 42 and 43 respectively. A local oscillator 44 is connected directly to mixer 43 and the output amplified in intermediate frequency amplifier 45 and combined in the intermediate frequency amplifier 46. The oscillations from local oscillator 44 are applied through phase shifter 47 to the mixer 42, with the output of the mixer being applied to the intermediate frequency amplifier 48 and then combined in the intermediate frequency amplifier 46. A control 49 operated by the signal strength in the intermediate frequency amplifier 46 may adjust the phase shifter 47 so that the signals in the two paths have the proper phase relationship to combine in the intermediate frequency amplifier 46 to provide a maximum total signal. The control 49 is therefore generally similar to the control 28 of Fig. 2.

Figure 5:
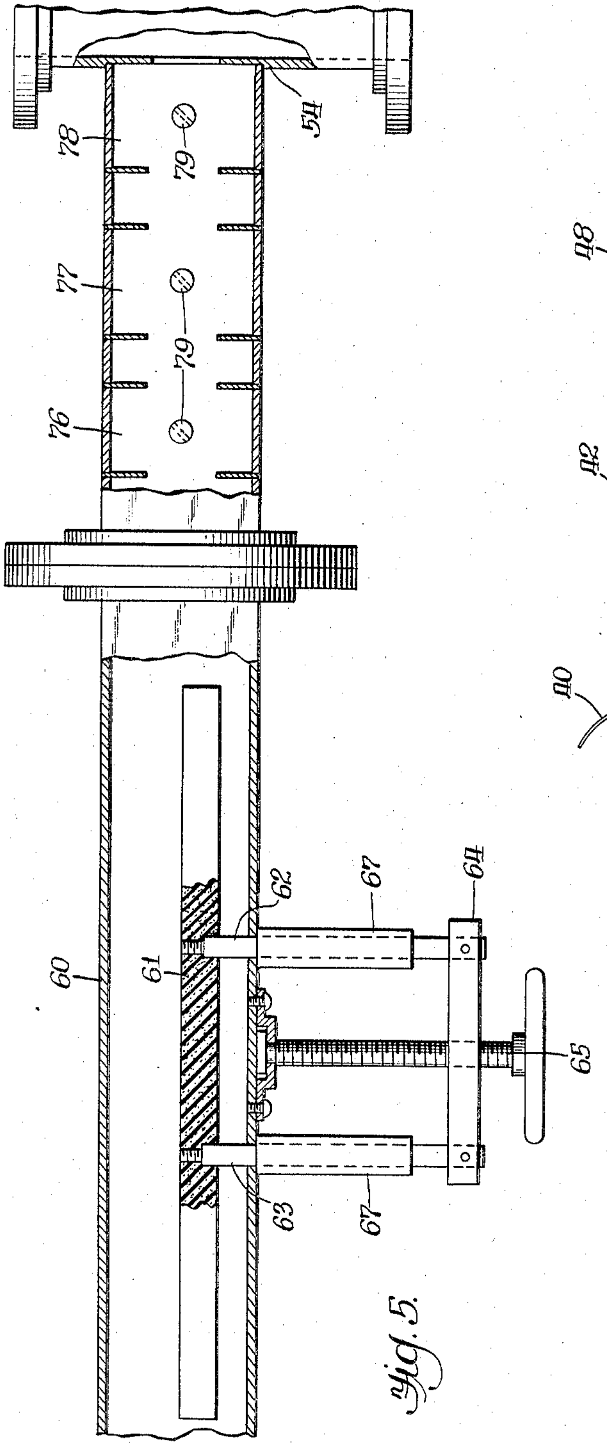
Fig. 5 illustrates the structure of a phase shifter and filter which may be used in the above systems.

Fig. 5 illustrates more particularly one practical construction of the phase shifter 25. The phase shifter includes a wave guide section 60 in which there is positioned a dielectric member 61. The dielectric member 61 is supported by rods 62 and 63 which are connected to a carriage 64. The rods 62 and 63 slide in guide cylinders 67. The carriage 64 is moved by a drive crank 65 which may be manually controlled.

In Fig. 5 there is also illustrated an example at construction of the cavity filter 26 which is provided in the wave guide T54. The filter is a triple cavity including the sections 76, 77 and 78 each of which has a tuning screw 79 therein for providing precise control of the frequency characteristics thereof. Flters having less or more than three cavities may be used in accordance with the particular application.

It will be obvious that a phase shifter as shown in Fig. 5 could be used in the system shown in Fig. 4 wherein the waves from the local oscillator 44 are shifted before application to the mixer 42. For operation at microwave frequencies the local oscillations will be of such frequencies that transmission through a waveguide is practical. For operation at lower frequencies other suitable phase shifting means may be provided.

The purpose of the phase shifter is to adjust the phase of the incoming signal obtained from one of the antennas to coincide with the phase of the signal obtained from the other antenna so that maximum reception will result. As the difference between two path lengths changes, this phase shifter has to be readjusted continuously either by hand or by automatic control. Various arrangements can be used to adjust the phase shifter automatically so that the optimum reception can be obtained. In general, such an automatic control has to translate the signal strength indication obtained from the microwave receiver into the movement of the phase shifter. If the signal is of normal strength and no multipath propagation is experienced and fading occurs, this device should be disabled. However, if the signal drops below normal, this device should operate the phase shifter in one direction or the other. If by operating the phase shifter in one direction the signal further decreases, the rotation of the phase shifter should be reversed automatically and the device should operate as long as the signal strength increases and should stop automatically at the maximum signal strength. Furthermore, phase shifts of more than 360° may be encountered. In such case, if the phase shifter covers only 360° and is shifted to one of its extreme positions, and indications are that further phase shifting in the same direction is necessary, the phase shifter should be moved back rapidly by some 360° and then automatic control should resume the phase correction.

The system in accordance with the invention operates to change the phase of the signal from one antenna so that the combined signals provide an acceptable signal for the receiver. Since the system requires only a single receiver, it is relatively simple and has been found to be highly satisfactory in operation. As previously stated, the movement of the phase shifter may be either manual or automatic, and in the event that adjustment is required only infrequently, manual operation may be adequate. However, it may be desired to use the system at unattended stations, and/or to rapidly follow changes in phase, and in such cases automatic operation is necessary.

Although certain embodiments of the invention have been disclosed which are illustrative thereof, it is obvious that various changes and modifications can be made therein without departing from the intended scope of the invention as defined in the appended claims.

We claim:

1. A diversity receiving system for microwaves including in combination, first and second antenna means including physically spaced elements for receiving carrier waves from a single source over two separate paths, means for combining carrier waves from said antenna means to provide an output carrier wave, first and second signal channels individually connecting said antenna means to said combining means for applying received carrier waves to said combining means as modulated carrier waves, said signal channels including hollow single-conductor wave guide means for conducting said carrier waves therethrough, adjustable phase shift means in said wave guide means of one of said channels for controlling the phase of the carrier waves applied through said one channel to said combining means, and means controlled by the output of said combining means for adjusting said phase shift means so that the carrier waves applied to said combining means are in phase and the output carrier waves from said combining means is a maximum.

2. A diversity receiving system for microwaves including in combination, first and second antenna means including physically spaced elements for receiving carrier waves from a single source over two separate paths, means for combining carrier waves from said antenna means to provide an output carrier wave, first and second signal channels individually connecting said antenna means to said combining means for applying received carrier waves to said combining means as modulated carrier waves, a local oscillator, each of said channels including mixer means connected between said antenna means and said combining means, and conducting means for applying signals from said local oscillator to said mixer means, said conducting means including hollow single-conductor wave guide means for conducting signals therethrough, adjustable phase shift means in said wave guide means of one of said channels for controlling the phase of the signals from said local oscillator and thereby controlling the phase of the modulated carrier waves applied through said one channel to said combining means, and means controlled by the output of said combining means for adjusting said phase shift means so that carrier waves applied from said one channel to said combining means are in phase with the carrier waves applied from the other channel to said combining means, and the output carrier wave from said combining means is a maximum.

References Cited in the file of this patent

UNITED STATES PATENTS

| | | |
|---|---|---|
| 2,303,644 | Katzin | Dec. 1, 1942 |
| 2,349,407 | Crosby | May 23, 1944 |
| 2,375,126 | Mathes | May 1, 1945 |
| 2,505,266 | Villem | Apr. 25, 1950 |
| 2,567,197 | Fox | Sept. 11, 1951 |
| 2,587,590 | Brewer | Mar. 4, 1952 |
| 2,610,292 | Bond et al. | Sept. 9, 1952 |
| 2,630,492 | Muchmore | Mar. 3, 1953 |
| 2,640,915 | Sichak | June 2, 1953 |
| 2,678,385 | Atwood | May 11, 1954 |